(12) United States Patent
Tang et al.

(10) Patent No.: US 11,103,980 B2
(45) Date of Patent: Aug. 31, 2021

(54) ASSEMBLY TOOL SMART CONFIGURATION SELECTOR BY MEANS OF ORIENTATION DETECTION

(71) Applicant: INGERSOLL-RAND INDUSTRIAL U.S., INC., Davidson, NC (US)

(72) Inventors: Chun Jian Tang, Washington, NJ (US); Shreyas Patil, Bangalore (IN)

(73) Assignee: INGERSOLL-RAND INDUSTRIAL U.S., INC., Davidson, NC (US)

( * ) Notice: Subject to any disclaimer, the term of this patent is extended or adjusted under 35 U.S.C. 154(b) by 166 days.

(21) Appl. No.: 16/159,589

(22) Filed: Oct. 12, 2018

(65) Prior Publication Data
US 2020/0114496 A1    Apr. 16, 2020

(51) Int. Cl.
| | |
|---|---|
| *B25B 21/00* | (2006.01) |
| *B25B 21/02* | (2006.01) |
| *B25B 23/147* | (2006.01) |
| *B25J 9/16* | (2006.01) |

(52) U.S. Cl.
CPC ............ *B25B 21/008* (2013.01); *B25B 21/02* (2013.01); *B25B 23/1475* (2013.01); *B25J 9/1633* (2013.01)

(58) Field of Classification Search
CPC ... B25B 21/008; B25B 21/02; B25B 23/1475; B25J 9/1633
See application file for complete search history.

(56) References Cited

U.S. PATENT DOCUMENTS

| | | | |
|---|---|---|---|
| 5,129,044 A * | 7/1992 | Kashiwagi | B25J 9/1633 |
| | | | 700/251 |
| 5,914,882 A * | 6/1999 | Yeghiazarians | F16P 3/00 |
| | | | 408/1 R |
| 6,247,387 B1 | 6/2001 | Ketteringham | |
| 7,062,831 B2 * | 6/2006 | Walt, II | B23P 19/066 |
| | | | 29/407.02 |
| 7,540,334 B2 | 6/2009 | Gass et al. | |
| 7,565,844 B2 | 7/2009 | Crass et al. | |
| 8,050,788 B2 * | 11/2011 | Stencel | G05B 19/41805 |
| | | | 700/117 |
| 8,166,836 B2 | 5/2012 | Rudduck | |
| 8,443,703 B2 | 5/2013 | Chen | |

(Continued)

FOREIGN PATENT DOCUMENTS

| | | |
|---|---|---|
| DE | 102001003415 A1 | 2/2012 |
| DE | 102013212170 A1 | 1/2015 |

(Continued)

OTHER PUBLICATIONS

Patentability Search Report dated Mar. 3, 2017.

*Primary Examiner* — Nathaniel C Chukwurah
*Assistant Examiner* — Lucas E. A. Palmer
(74) *Attorney, Agent, or Firm* — Kevin E. West; Advent, LLP

(57) ABSTRACT

The present invention provides methods and systems an impact wrench having dynamically tuned drive components, such as an anvil/socket combination, and related methodology for dynamically tuning the drive components in view of inertia displacement, as well as stiffness between coupled components, and with regard to impact timing associated with clearance gaps between the component parts.

13 Claims, 7 Drawing Sheets

(56) References Cited

U.S. PATENT DOCUMENTS

| | | | |
|---|---|---|---|
| 8,676,368 B2* | 3/2014 | Stencel | B25B 23/14 700/108 |
| 9,533,403 B2 | 1/2017 | Lee et al. | |
| 2007/0272423 A1* | 11/2007 | Cutler | B25B 23/14 173/1 |
| 2008/0110653 A1* | 5/2008 | Zhang | H02P 29/032 173/1 |
| 2011/0114345 A1* | 5/2011 | Schlesak | B25F 5/024 173/1 |
| 2012/0240392 A1 | 9/2012 | Rudduck | |
| 2014/0102742 A1* | 4/2014 | Eshleman | B25B 23/147 173/183 |
| 2014/0166323 A1* | 6/2014 | Cooper | F16P 3/148 173/1 |
| 2014/0231114 A1* | 8/2014 | Schenk | B23B 31/1253 173/20 |
| 2014/0262392 A1* | 9/2014 | Petrossians | G01M 1/22 173/20 |
| 2014/0336810 A1 | 11/2014 | Li et al. | |
| 2016/0054721 A1* | 2/2016 | Oberg | B25B 21/00 700/168 |
| 2016/0129569 A1 | 5/2016 | Lehnert et al. | |
| 2017/0246732 A1* | 8/2017 | Dey, IV | G01D 5/2006 |
| 2019/0126456 A1* | 5/2019 | Abbott | H02K 11/21 |
| 2019/0232471 A1* | 8/2019 | Paoli | B23P 19/066 |

FOREIGN PATENT DOCUMENTS

| | | |
|---|---|---|
| EP | 2085849 A2 | 8/2009 |
| GB | 2486658 A | 6/2011 |
| JP | 2014006080 A | 1/2014 |

* cited by examiner

ASSEMBLY TOOL SMART CONFIGURATION SELECTOR BY MEANS OF ORIENTATION DETECTION

BACKGROUND

Technical Field

The following relates generally to assembly tools, and more particularly relates to an improved assembly tool provided to facilitate user-customizable automatic tool configuration selection based on sensed tool orientation.

State of the Art

It can be quite common for fasteners (such as bolts and nuts) located on the same face/side of a product (like an automobile frame) to require the same target torque to properly secure each of the fasteners on that face/side of the product. Moreover, fasteners located on the same face/side of a product oftentimes orient at the same fastening angle. However, additional fasteners on the same product, but located on a different face/side of the product, may fasten with differing requisite target torques and/or angles. For example, when assembling a vehicle, fasteners driven from the top of the vehicle chassis may require 18 Nm torque and fasten along a vertical axis, but fasteners driven from the front of the chassis may require 12 Nm of torque and fasten along a horizontal axis. Hence, to fasten all the fasteners on the various sides of a product, a fastening tool operator often must manually select a proper fastening configuration corresponding to a certain face/side of the product. This manual selection may slow tool utilization, thereby decreasing productivity. Then, if fasteners are to be fastened to a different face/side of the product, the operator must, again, manually adjust the tool to a different torque setting and fastening angle. Moreover, repetitive manual selection is often more prone to human error. Therefore, a need exists for a tool configuration selection system and methodology which allows an operator to customize automatic fastening configuration based on the tool orientation and torque requirements corresponding to fasteners located on a particular face/side of a product.

SUMMARY

An aspect of the present disclosure provides an orientation detection smart configuration assembly tool comprising: a sensor array for detecting tool orientation; a user interface for selecting tool configuration based on tool orientation detected by the sensor array; and an electronic control unit, including: a sensor and signal conditioning module, operable to communicate sensor data detected by the sensor array; a criteria evaluation and processing module operable in accordance with governing protocol setting forth predetermined parameters of assembly tool functionality based on orientation of the assembly tool; and a user interface module, operable with the user interface to select a configuration of the assembly tool based on the detected assembly tool orientation.

Another aspect of the present disclosure provides a method of configuring an assembly tool, the method comprising: providing an assembly tool including a tool orientation detection smart configuration system; selecting a tool configuration, by input from a user through a user interface of the tool orientation detection smart configuration system, wherein the configuration corresponds to at least one fastener on a face of a product; establishing predetermined parameters associated with tool orientation when the tool is poised to fasten the at least one fastener on the face of the product according to the selected tool configuration; sensing tool orientation by a sensor array, and generating corresponding sensor data; processing the sensor data by a criteria evaluation and processing module; determining tool orientation from the processed sensor data; and configuring the tool in accordance with the determined tool orientation and in compliance with the selected tool configuration established by the predetermined parameters.

Still another aspect of the present disclosure provides a tool orientation detection smart configuration system comprising: an electronic control unit, the electronic control unit including: a sensor and signal conditioning module; a criteria evaluation and processing module; a user interface module; and executable software, wherein the software includes governing protocol directing controlling activities corresponding to sensor data processing, execution according to predetermined parameters, and user-customized configuration selection; a sensor array configured to send detected sensor data to the electronic control unit for processing; and a user interface, communicatively operable with the electronic control unit, wherein the user interface is configured to receive user input pertaining to a selected configuration for set operation of the assembly tool when poised in a particular orientation.

The foregoing and other features, advantages, and construction of the present disclosure will be more readily apparent and fully appreciated from the following more detailed description of the particular embodiments, taken in conjunction with the accompanying drawings.

BRIEF DESCRIPTION OF THE DRAWINGS

Some of the embodiments will be described in detail, with reference to the following figures, wherein like designations denote like members.

DETAILED DESCRIPTION OF EMBODIMENTS

A detailed description of the hereinafter described embodiments of the disclosed apparatus and method are presented herein by way of exemplification and not limitation with reference to the Figures listed above. Although certain embodiments are shown and described in detail, it should be understood that various changes and modifications may be made without departing from the scope of the appended claims. The scope of the present disclosure will in no way be limited to the number of constituting components, the materials thereof, the shapes thereof, the relative arrangement thereof, etc., and are disclosed simply as an example of embodiments of the present disclosure.

Figure 1:
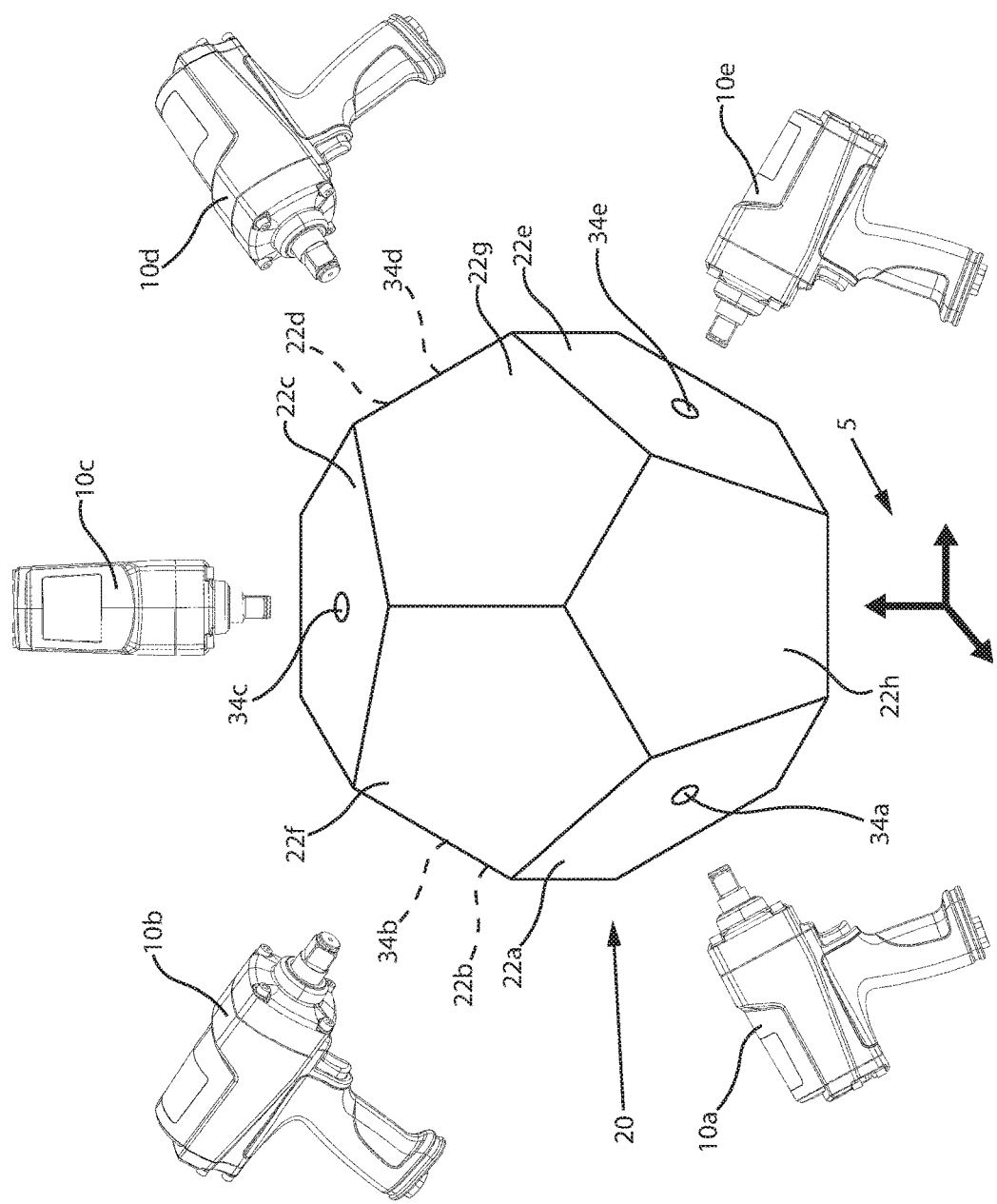
FIG. 1 is a side perspective view of embodiments of assembly tools oriented around a product having fasteners located on various faces, wherein the assembly tools comprise user-customizable automatic tool configuration selection based on sensed tool orientation.

Referring now specifically to the drawings, FIG. 1 depicts a side perspective view of embodiments of assembly tools 10a-10e oriented around a product 20 embodiment having embodied fasteners 34a-34e located on some of the various embodied faces 22a-22h of the product 20 embodiment, wherein the assembly tools, such as depicted assembly tools 10a-10e, operably comprise user-customizable automatic tool configuration selection functionality based on sensed tool orientation. For convenience, a typical three-axis orientation 5 is merely symbolically depicted to help provide orientation perspective. Notably, as depicted, assembly tools 10b and 10d are oriented respectively toward (not directly visible) fasteners 34b and 34d (identified by dashed lead lines) located respectively on (also not directly visible) faces 22b and 22d (also identified by dashed lead lines). Each assembly tool embodiment 10a-10e is respectively oriented toward a corresponding fastener 34a-34e located respectively on certain corresponding faces 22a-22e of the product 20. A user of any of the assembly tool embodiments 10a-10e may be able to customize his/her own selected configuration for tool operation, based on a sensed orientation of the corresponding tool 10a-10e. For instance, a tool operator may designate a 14 Nm target torque when an embodied assembly tool, such as assembly tool 10e, is oriented so as to be approximately perpendicularly faced toward a corresponding fastener 34e located on corresponding face 22e of the product 10. When the embodied assembly tool 10e senses and detects that its orientation meets, or otherwise falls within a directional range of a predetermined orientation, the assembly tool orientation detection smart configuration selection system 100 of the assembly tool 10e will automatically change the configuration of the assembly tool 10e, to the desired target torque of 14 Nm associated with the corresponding orientation angle. As such user may be able to perform fastening operations on all sides of a product 20 at different target torques without manually changing any configuration. In other words, the assembly tool 10e orientation and torque output configuration may be automated, which may speed up the process of changing configuration(s) to fasten several different fasteners, such as the several fasteners 34a-34e of the product 10, and thus increase productivity. Such an automated approach may also eliminate operator error resulting from potentially selecting an incorrect assembly tool 10e configuration.

Figure 2:
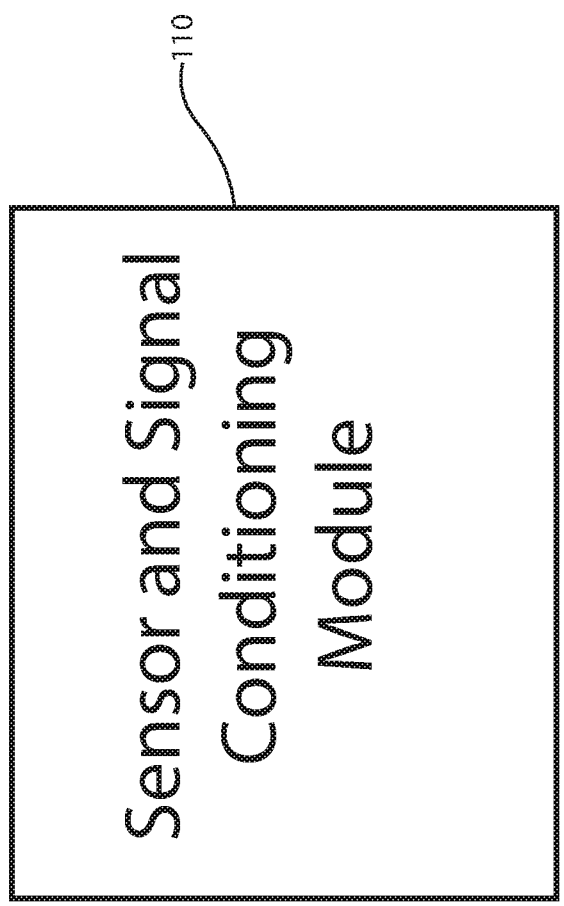
FIG. 2 is a schematic view of an embodiment of a sensor and signal conditioning module of an embodiment of an electronic control unit of an assembly tool orientation detection smart configuration selection system embodiment.
Figure 6:
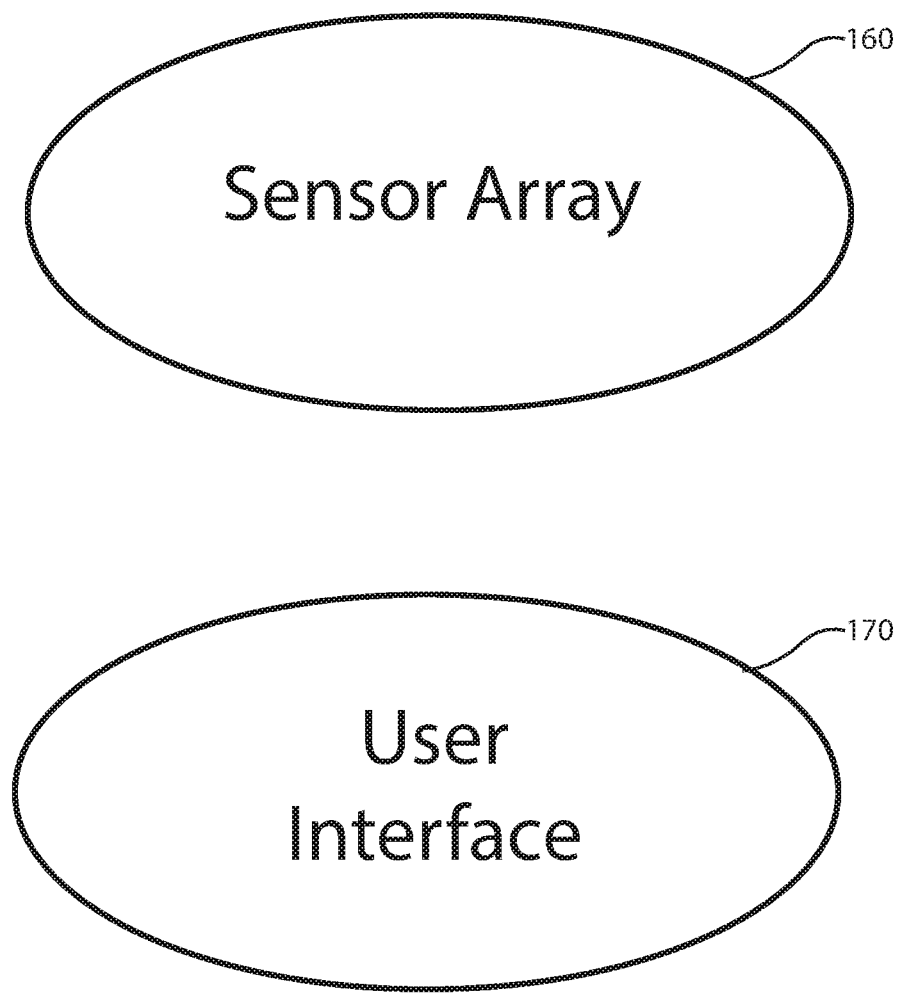
FIG. 6 is a schematic view of embodiments of a sensor array and a user interface operable with embodiments of an electronic control unit of an assembly tool orientation detection smart configuration system embodiment.
Figure 7:
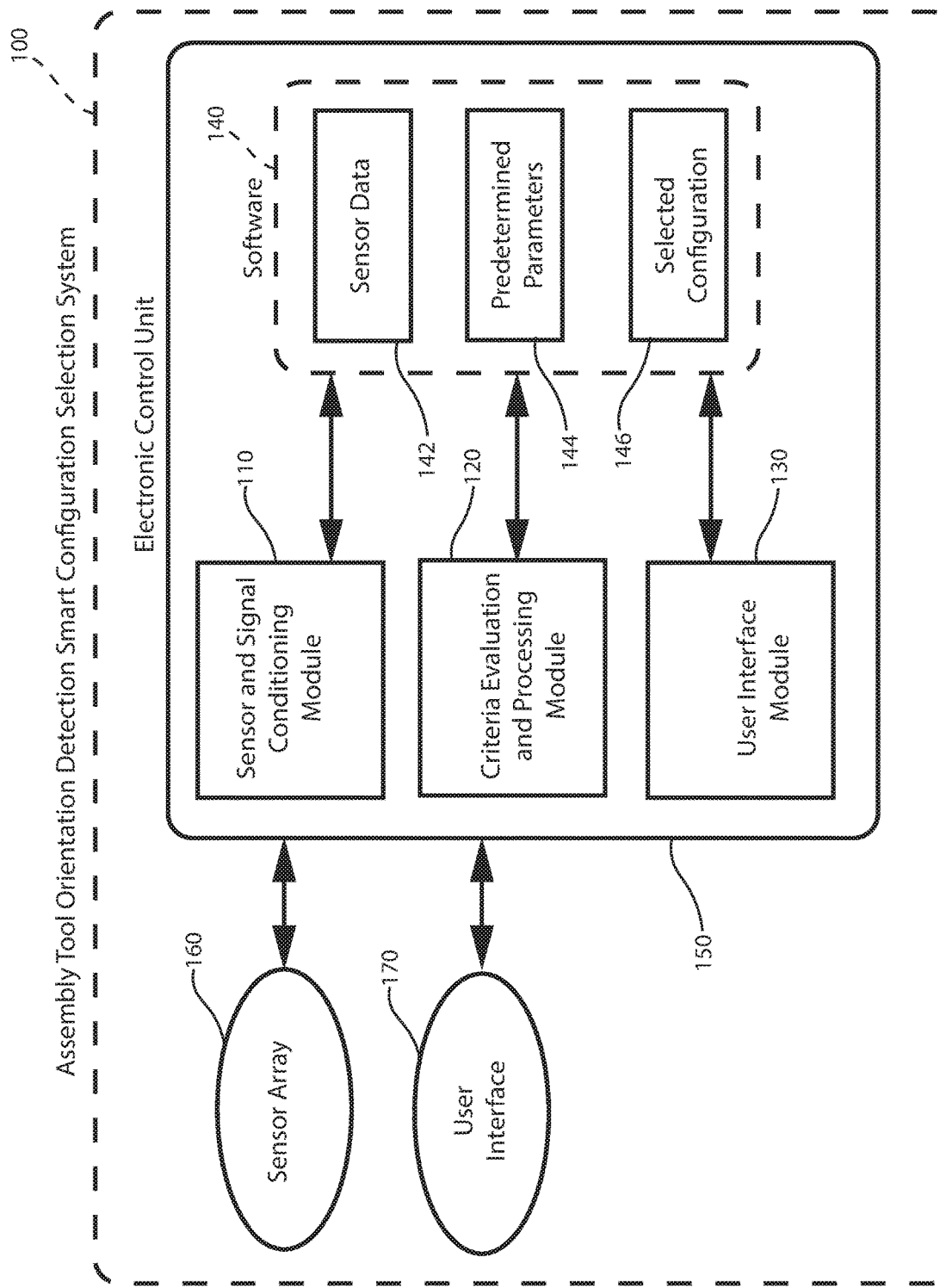
FIG. 7 is a schematic view of an embodiment of an assembly tool orientation detection smart configuration system incorporated as part of and/or operable with embodiments of assembly tools comprising user-customizable automatic tool configuration selection based on sensed tool orientation.

Embodiments of orientation detection smart configuration assembly tools, such as assembly tools 10a-10e, may include various features to help facilitate effectuation of assembly tool orientation detection and smart configuration selection. With further reference to the drawings, FIG. 2 depicts a schematic view of an embodiment of a sensor and signal conditioning module 110 of an embodiment of an electronic control unit 150 of an assembly tool orientation detection smart configuration selection system 100 embodiment (as depicted in FIG. 7). A sensor and signal conditioning module 110 may operate, inter alia, to communicate with and control various sensors of a sensor array 160 (see FIGS. 6-7) of an assembly tool orientation detection smart configuration selection system 100 of an orientation detection smart configuration assembly tool 10. Moreover, embodiments of a sensor and signal conditioning module 110 may operate according to governing protocol set forth by software 140 and pertaining to processed sensor data 142 (see FIG. 7).

Figure 3:
FIG. 3 is a schematic view of an embodiment of a criteria evaluation and processing module of an embodiment of an electronic control unit of an assembly tool orientation detection smart configuration selection system embodiment.
Figure 4:
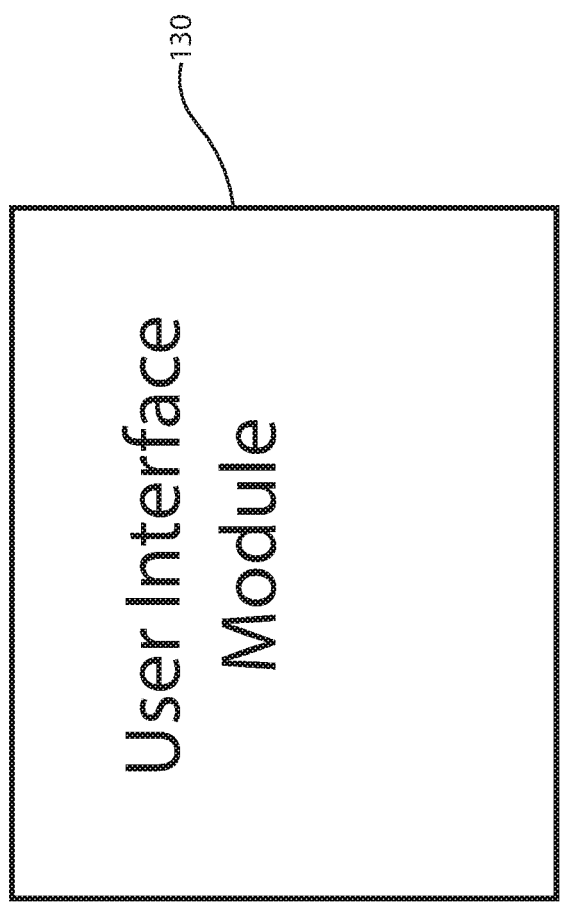
FIG. 4 is a schematic view of an embodiment of a user interface module of an embodiment of an electronic control unit of an assembly tool orientation detection smart configuration selection system embodiment.

Turning further to the drawings, FIG. 3 depicts a schematic view of an embodiment of a criteria evaluation and processing module 120 of an embodiment of an electronic control unit 150 of an assembly tool orientation detection smart configuration selection system 100 embodiment. A criteria evaluation and processing module 120 may operate to execute governing protocol associated with software 140 to, inter alia, process sensor data 142 and execute software 140 protocol when predetermine parameters 144 are detected, to effectuate a selected configuration 146, associated with an assembly tool orientation sensed by the sensor array 160 and determined by the criteria evaluation and processing module 120. A user interface module 120, as schematically depicted in FIG. 4, may allow a user/operator, to set a desired fastening strategy configuration for the assembly tool, such as assembly tool 10e, corresponding to a certain orientation, such as approximately perpendicular to the face 22e of product 10, upon which a corresponding fastener 34e is desired to be fastened. For instance, a user/operator could hold the assembly tool, such as assembly tool 10e, in the approximate desired orientation for fastening, and then the criteria evaluation and processing module may process a sensed current zenith angle determined by the sensor and signal conditioning module 110 and require, via operable control by the user interface module 150, the user/operator to input, via the user interface 170 (see FIGS. 6-7) a tolerance range, or other like characteristic, as a selected configuration 146 for set operation of the assembly tool, such as assembly tool 10e.

Figure 5:
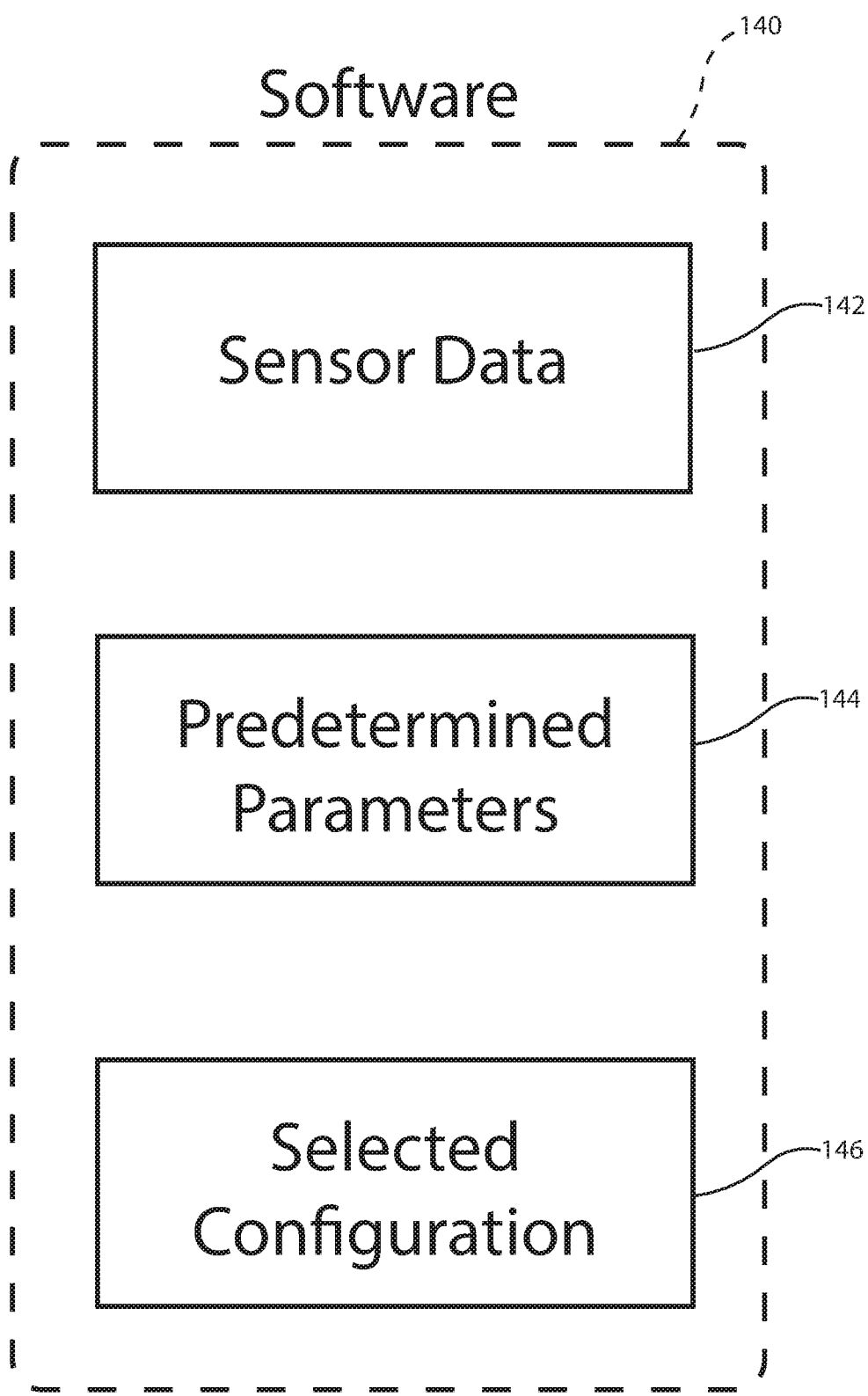
FIG. 5 is a schematic view of an embodiment of software components of an embodiment of an electronic control unit of an assembly tool orientation detection smart configuration selection system embodiment.

Turning yet again to the drawings, FIG. 5 depicts a schematic view of an embodiment of software components 140 of an embodiment of an electronic control unit 150 of an assembly tool orientation detection smart configuration selection system 100 embodiment. Significant sensor data 142 may be sensed and communicated by the sensor array 160 (see FIGS. 6-7) to the sensor and signal conditioning module 110 and processed by the criteria evaluation and processing module 120, in accordance with governing protocol associated with software 140. The software 140 may, at the very least, provide logical directive(s) regarding acquired sensor data 142, effectuate action(s) pertaining to predetermined parameters 144, and/or execute directive(s) for selected configurations 146 based upon user/operator input and sensed tool orientation.

Embodiments of an orientation detection smart configuration assembly tool, such as assembly tools 10a-10e, may detect external conditions, such as tool orientation, and may interface with tool users/operators, to help produce smart and efficient assembly tool configuration. FIG. 6 depicts a schematic view of embodiments of a sensor array 160 and a user interface 170 operable with embodiments of an electronic control unit 150 of an assembly tool orientation detection smart configuration system 100 embodiment. A sensor array 160 may include various sensors, such as an orientation sensor, a magnetometer, a gyroscope sensor, a light sensor, an accelerometer, or a combination thereof. The sensors of the sensor array 160 may be mounted on a printed circuit board, which printed circuit board may be located in the assembly tool in such a way that when a user/operator rotates, or otherwise moves, the tool, at least one of the sensors will detect the movement. For example, when the tool is rotated, a sensor may correspondingly rotate along a similar axis. The sensors of the sensor array 160, as controlled by the sensor and signal conditioning module, may constantly monitor the orientation of the assembly tool and send corresponding sensor data 140 to the processing module 120, to be processed according to governing protocol of applicable software 140. Embodiments of a user interface may facilitate interaction between the assembly tool and a user/operator. For instance, a user interface may include a touch screen, a speaker and microphone, light indicators, audio indicators, vibration mechanisms, input buttons and knobs, and combinations of all and/or the like, to facilitate effective interface between a user/operator and the orientation detection smart configuration assembly tool, such as assembly tools 10a-10e. A user may, for example, utilize the user interface 170 to set a selected configuration 146 of a target torque to be 18 Nm, when a zenith angle is detected to be 90°, within a tolerance of ±5°. In such a case, when sensors sense that the tool is between an 85° and 90° zenith angle, the sensor signal and conditioning module 110 may operate with the criteria evaluation and processing module 120 to automatically elect an active configuration for the tool to be 18 Nm target torque. The processing module 120, as governed by the selected configuration 146 of the software 140 protocol, may maintain this selected configuration 146 until the sensor array 160 detects the condition of another tool orientation to be met.

An embodiment of an assembly tool orientation detection smart configuration system 100 incorporated as part of and/or operable with embodiments of assembly tools, such as assembly tools 10-10e, comprising user-customizable automatic tool configuration selection based on sensed tool orientation is schematically depicted in FIG. 7. As depicted, the assembly tool orientation detection smart configuration system 100 may include a sensor array 160 and a user interface 170 communicatively operable with an electronic control unit 150. The electronic control unit 150 may include software 140 setting forth governing protocol pertaining to actions associated with sensor data 142, predetermined parameters 144 and/or selected configurations 146 of an assembly tool, such as assembly tools 10a-10e. The software 140 may operate with various modules, such as a sensor and signal conditioning module 110, a criteria evaluation and processing module 120 and a user interface module 130, to effectively operate the control unit 150 of the assembly tool, such as assembly tools 10a-10e, in conjunction with the sensor array 160 and the user interface 170. Such operation may yield user-customizable configurations automatically achievable through self-aware detection by the orientation detection smart configuration assembly tool, such as assembly tools 10a-10e. Those of ordinary skill in the art should appreciate that a single assembly tool may be configured to operate with configurations commensurate with any of the orientations pertaining to assembly tools 10a-10e.

The components and features defining embodiments of the above-described orientation detection smart configuration assembly tool 10, such as assembly tools 10a-10e, comprising an assembly tool orientation detection smart configuration system 100 incorporated as part of and/or operable with embodiments of the assembly tool 10 may be formed of any of many different types of materials or combinations thereof that can readily be formed into shaped objects provided that the components selected are consistent with the intended operation of orientation detection smart configuration assembly tool 10 and corresponding assembly tool orientation detection smart configuration systems 100 of the type disclosed herein. For example, and not limited thereto, the components may be formed of: rubbers (synthetic and/or natural) and/or other like materials; glasses, such as fiberglass, silicate glass, naturally occurring glass, or any other amorphous solid material, any combination thereof, and/or other like materials; ceramics or any other crystalline or partly crystalline material, any combination thereof, and/or other like materials; wood or any other hard, fibrous structural tissue or material, any combination thereof, and/or other like materials; carbon-fiber, aramid-fiber, any combination thereof, and/or other like materials; polymers such as thermoplastics (such as ABS, Fluoropolymers, Polyacetal, Polyamide; Polycarbonate, Polyethylene, Polysulfone, and/or the like), thermosets (such as Epoxy, Phenolic Resin, Polyimide, Polyurethane, Silicone, and/or the like), any combination thereof, and/or other like materials; composites and/or other like materials; metals, such as zinc, magnesium, titanium, copper, iron, steel, carbon steel, alloy steel, tool steel, stainless steel, aluminum, any combination thereof, and/or other like materials; alloys, such as aluminum alloy, titanium alloy, magnesium alloy, copper alloy, any combination thereof, and/or other like materials; any other suitable material; and/or any combination.

Furthermore, the components defining the above-described orientation detection smart configuration assembly tool 10, such as assembly tools 10a-10e, comprising an assembly tool orientation detection smart configuration system 100 incorporated as part of and/or operable with embodiments of the assembly tool 10 embodiment(s) may be purchased pre-manufactured or manufactured separately and then assembled together. However, any or all of the components may be manufactured simultaneously and integrally joined with one another. Manufacture of these components separately or simultaneously may involve extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, 3-D printing, and/or the like. If any of the components are manufactured separately, they may then be coupled with one another in any manner, such as with adhesive, a weld, a fastener (e.g. a bolt, a nut, a screw, a nail, a rivet, a pin, and/or the like), wiring, any combination thereof, and/or the like for example, depending on, among other considerations, the particular material forming the components. Other possible steps might include sand blasting, polishing, powder coating, zinc plating, anodizing, hard anodizing, and/or painting the components for example.

While this disclosure has been described in conjunction with the specific embodiments outlined above, it is evident that many alternatives, modifications and variations will be apparent to those skilled in the art. Accordingly, the preferred embodiments of the present disclosure as set forth above are intended to be illustrative, not limiting. Various changes may be made without departing from the spirit and scope of the present disclosure, as required by the following claims. The claims provide the scope of the coverage of the present disclosure and should not be limited to the specific examples provided herein.

What is claimed is:

1. A power tool assembly comprising:
   at least one sensor for detecting one or more orientations of the power tool assembly and generating orientation data in response thereto;
   a user interface for allowing selection of at least one tool configuration setting, the at least one tool configuration setting corresponding to at least one orientation of the power tool assembly; and
   an electronic control unit in communication with the at least one sensor and the user interface, the electronic control unit configured to:
   process the orientation data from the at least one sensor, determine an orientation of the power tool assembly based on the orientation data, and
   change a tool configuration of the power tool assembly based on the at least one tool configuration setting and the determined orientation of the power tool assembly;
   wherein the electronic control unit changes the tool configuration by selecting between at least a first tool configuration setting and a second tool configuration setting, the first tool configuration setting selected when the power tool assembly is determined to have a first orientation and the second tool configuration setting selected when the power tool assembly is determined to have a second orientation.

2. The power tool assembly as recited in claim 1, wherein the tool configuration is a torque to be applied to a fastener workpiece, the first tool configuration is a first torque setting to be applied to a first fastener workpiece having a first workpiece orientation and the second tool configuration is a second torque setting to be applied to a second fastener having a second workpiece orientation.

3. The power tool assembly as recited in claim 2, wherein the torque applied by the power tool assembly increases when the electronic control unit changes the tool configuration from the first tool configuration setting to the second tool configuration setting and the torque specified by the second tool configuration setting is higher than the torque specified by the first tool configuration setting.

4. The power tool assembly as recited in claim 1, wherein the electronic control unit selects one of the first tool configuration setting or the second tool configuration setting when the determined orientation of the power tool assembly is within a tolerance range from the first orientation or the second orientation, respectively.

5. The power tool assembly as recited in claim 4, wherein the electronic control unit automatically changes from the first tool configuration setting to the second tool configuration setting when the at least one sensor detects the orientation of the power tool assembly is within a tolerance range from the second orientation.

6. The power tool assembly as recited in claim 5, wherein the tolerance range is within five degrees (5°) from a zenith angle orientation identified by the at least one sensor.

7. The power tool assembly as recited in claim 1, wherein the at least one sensor comprises at least one of a magnetometer, a gyroscope, a light sensor, or an accelerometer.

8. A power tool assembly comprising:
   at least one sensor for detecting one or more orientations of the power tool assembly and generating orientation data in response thereto;
   a user interface for allowing selection of at least one torque setting, the at least one torque setting corresponding to at least one orientation of the power tool assembly; and
   an electronic control unit in communication with the at least one sensor and the user interface, the electronic control unit comprising a processor for processing the orientation data acquired by the at least one sensor, determining an orientation of the power tool assembly based on the orientation data, and changing a torque of the power tool assembly based on the at least one torque setting and the orientation of the power tool assembly;
   wherein the processor changes the torque by selecting between at least a first torque setting and a second torque setting, the first torque setting selected when the power tool assembly is determined to have a first orientation, and the second torque setting selected when the power tool assembly is determined to have a second orientation.

9. The power tool assembly as recited in claim 8, wherein the torque applied by the power tool assembly increases when the processor changes the tool configuration from the first tool configuration setting to the second tool configuration setting and the torque specified by the second tool configuration setting is higher than the torque specified by the first tool configuration setting.

10. The power tool assembly as recited in claim 8, wherein the electronic control unit automatically elects a first torque setting if the at least one sensor detects the orientation of the power tool assembly is within a tolerance range from a zenith angle of the first orientation.

11. The power tool assembly as recited in claim 10, wherein the electronic control unit automatically changes from the first torque setting to the second torque setting when the at least one sensor detects the orientation of the power tool assembly is within a tolerance range from the second orientation.

12. The power tool assembly as recited in claim 11, wherein the tolerance ranges within five degrees (5°) from a zenith angle orientation identified by the at least one sensor.

13. The power tool assembly as recited in claim 8, wherein the at least one sensor comprises one or more of a magnetometer, a gyroscope, a light sensor, or an accelerometer.

* * * * *